United States Patent [19]
Wuidart et al.

[11] Patent Number: 6,046,916
[45] Date of Patent: Apr. 4, 2000

[54] HIGH AND LOW D.C. VOLTAGE POWER SUPPLY

[75] Inventors: Luc Wuidart, Pourrieres; Alain Bailly, Simiane, both of France

[73] Assignee: SGS-Thomson Microelectronics S.A., Gentilly, France

[21] Appl. No.: 08/901,018

[22] Filed: Jul. 25, 1997

[30] Foreign Application Priority Data

Jul. 26, 1996 [FR] France .................................. 96 09681

[51] Int. Cl.[7] .................................................. H02M 3/06
[52] U.S. Cl. ............................ 363/62; 363/77; 363/126; 323/267
[58] Field of Search ............................. 323/267; 363/62, 363/76, 77, 81, 84, 89, 126

[56] References Cited

U.S. PATENT DOCUMENTS

| | | | |
|---|---|---|---|
| 4,999,759 | 3/1991 | Cavagnolo et al. ..................... | 323/267 |
| 5,406,471 | 4/1995 | Yamanaka ................................. | 363/62 |
| 5,627,455 | 5/1997 | Jacobs et al. ............................... | 363/89 |
| 5,781,001 | 7/1998 | Takemoto .................................. | 323/267 |

FOREIGN PATENT DOCUMENTS

| | | | |
|---|---|---|---|
| 0 714 160 | 5/1996 | European Pat. Off. | ....... H02M 3/155 |
| 28 36 325 | 2/1980 | Germany | ......... H02M 7/06 |

OTHER PUBLICATIONS

Telecommunications and Radio Engineering, vol. 48, No. 10, Oct. 1, 1993, pp. 7–13, Sergeyev, V.S. "Investigation of the Possibility of Using Capacitor Secondary Power Supplies".

*Primary Examiner*—Jeffrey Sterrett
*Attorney, Agent, or Firm*—Wolf, Greenfield & Sacks, P.C.; James H. Morris; Theodore E. Galanthay

[57] ABSTRACT

A device for providing a high d.c. voltage supply and a low d.c. voltage supply. The device includes, in parallel, a first diode connected in series with a capacitor, a rectifier having a polarity opposite to that of the first diode, and a breakover voltage limiter. The terminals of the low d.c. voltage source correspond to the terminals of the capacitor.

24 Claims, 1 Drawing Sheet

HIGH AND LOW D.C. VOLTAGE POWER SUPPLY

BACKGROUND OF THE INVENTION

1. Field of the Invention

The present invention relates to devices providing supply voltages.

2. Discussion of the Related Art

In the present patent application, the terminology <<high voltage>> refers to an incoming voltage corresponding, for example to a rectified main voltage. A high voltage may have a peak value of approximately a few hundred volts. <<Low voltage>> refers to a voltage which is lower than the high voltage, for example a control or supply voltage for electronic circuits, i.e., a voltage ranging from a few volts to a few tens of volts.

Generally, in the state of the art, when it is desired to simultaneously provide d.c. voltages to a load and to various circuits for controlling the load, a first supply circuit is provided for the load and a second supply circuit is provided for the control circuits. A drawback of such a double circuit is the duplication of circuitry and the fact that each circuit has distinct ohmic losses.

Transformers including a plurality of secondary windings are also used. Such transformers have the drawback of requiring additional windings and, therefore, of being cumbersome and expensive.

SUMMARY OF THE INVENTION

An object of the present invention is to provide a circuit for providing both a high and a low d.c. voltage source, in which the low voltage circuit does not cause additional ohmic losses.

To achieve this object, one embodiment of the present invention provides a device for providing a high and low d.c. voltage source, wherein the high voltage source comprises a first capacitor receiving a rectified a.c. voltage; the first capacitor is serially connected with the low voltage source; and the low voltage source includes, in parallel, a first diode connected in series with a capacitor, a rectifier having a polarity opposite to that of the first diode, and a breakover voltage limiter, terminals of the low d.c. voltage source corresponding to terminals of the capacitor.

According to an embodiment of the invention, the breakover device is formed by a thyristor having its gate and anode connected through a zener diode.

Preferably, a current limiter is connected in series with the voltage sources.

The foregoing and other objects, features, aspects and advantages of the invention will become apparent from the following detailed description of the present invention when taken in conjunction with the accompanying drawings.

DETAILED DESCRIPTION

Figure 1:
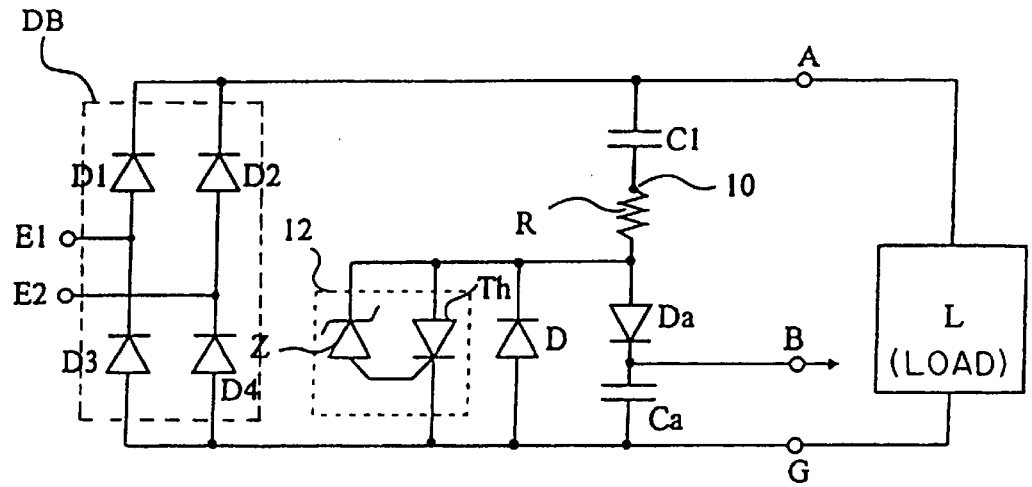
FIG. 1 represents a first embodiment of a high and low power supply according to the invention.

FIG. 1 represents one embodiment of the present invention based on a conventional circuit for supplying a load from the rectified voltage of the main supply. The main supply voltage available across terminals E1 and E2 is rectified by a rectifying diode bridge DB which includes, for example, diodes D1–D4. The rectified voltage is provided across terminals A and G of a load L. Conventionally, to smooth the voltage, a capacitor C1 is provided directly between terminals A and G (not shown). Thus, when capacitor C1 is charged and when the rectified input voltage drops below the capacitor's charge, capacitor C1 supplies the load. Of course, various alternatives of such a device are known in the art, for example to improve the regulation and/or the waveform of the current peaks extracted from the main supply when the capacitor is being charged.

Load L may be associated with electronic circuits which require a low supply voltage. To supply the low voltage, one embodiment of the present invention connects in series a diode Da and a capacitor Ca between the second terminal 10 of capacitor C1 and terminal G. Diode Da is biased to charge capacitor C1 and capacitor Ca. To discharge capacitor C1, a suitably biased diode D is connected between terminals A and G. Diode D can be replaced with a controlled device having a one-way conduction if it is desired to control the discharging periods of capacitor C1. Last, in order to regulate the voltage at capacitor Ca, a breakover circuit 12 is connected in parallel with capacitor Ca. The breakover circuit 12 becomes conductive between terminals 10 and G as soon as the voltage across capacitor Ca exceeds a predetermined threshold. The advantage of a breakover device over a zener diode lies in that, when the device is conductive, the voltage drop across its terminals is negligible. The breakover device can be a Shockley diode or, as represented, the combination of a thyristor Th with a zener diode Z.

One embodiment of a breakover device may operate as follows.

In a first phase, while capacitor C1 is being charged, capacitor Ca is simultaneously charged. Optionally, a resistor R is connected in series in the chain C1, Da, Ca to limit the current surge at the powering of capacitors C1 and Ca and the current surge at the triggering of thyristor Th.

As soon as capacitor Ca is biased at the value fixed by device 12 (voltage of the zener diode Z, plus the gate-cathode voltage drop of thyristor Th, minus the forward voltage drop of diode Da), device 12 becomes conductive and capacitor C1 continues to be charged in practically the same way with respect to the conventional configuration in which the terminal 10 of capacitor C1 is directly connected to terminal G.

During the period when the voltage across capacitor C1 is higher than the main supply voltage, capacitor C1 supplies load L through diode D.

Thus, from a possibly regulated high voltage source, formed by capacitor C1, a low voltage source regulated between terminals A and G of capacitor Ca is obtained, without addition of inductive elements and ohmic losses.

Figure 2:
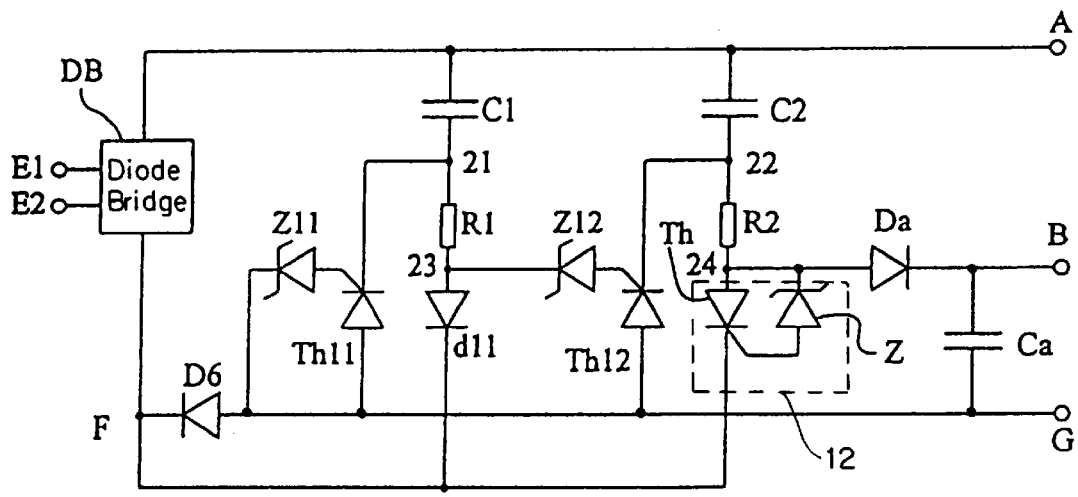
FIG. 2 represents a second embodiment of a high and low power supply according to the invention.

FIG. 2 illustrates an embodiment of a circuit according to the present invention where the circuit providing the high voltage includes a specific circuit designed to draw widened current peaks from the main supply (power factor corrector). A rectifying diode bridge DB receives the main supply voltage between terminals E1 and E2 and provides a rectified voltage between terminals A and F. This circuit includes at least two stages.

In the first stage, a storage capacitor C1 is associated with a charge path and discharge path. The charge path includes, between a terminal 21 and a terminal F, a resistor R1 and a diode d11 that is biased to conduct the charge current. The discharge path includes a thyristor Th11 having its gate connected to its anode through a zener diode Z11. The anode of thyristor Th11 is connected to terminal G, and to terminal F through a diode D6. Thus, capacitor C1 enters a discharge phase only when the voltage at terminal A becomes lower than its maximum value by approximately the avalanche voltage of the zener diode Z11.

The second stage includes elements similar to those of the first stage. The discharge path of capacitor C2 includes, from the second terminal 22 of capacitor C2, a thyristor Th12 having its gate connected to the node 23 between resistor R1 and diode d11 through Zener diode Z12. Thus, capacitor C1 stops discharging and capacitor C2 starts discharging when the voltage difference between nodes 21 and 22 becomes substantially equal to the avalanche voltage of the zener diode Z12. The charge path of capacitor C2 includes a resistor R2 having its terminal 24 connected to terminal G through the connection, in series, of a diode Da and an auxiliary capacitor Ca. A voltage limiting component 12, of the Shockley diode type, including for example a thyristor Th having its gate connected to its anode through a zener diode Z, limits the voltage across the connection, in series, of diode Da, capacitor Ca and diode D6.

In the circuit of FIG. 2, while capacitor C2 is being charged, capacitor Ca is simultaneously charged at a voltage which substantially corresponds to the threshold voltage of the zener diode Z (plus the gate-cathode voltage drop of thyristor Th, minus the direct voltage drops in diodes D6 and Da). Thus, between terminals B and G, the voltage is lower than the voltage between terminals A and G. When capacitor Ca is fully charged, at the desired threshold, the zener diode Z causes the conduction of thyristor Th. Capacitor Ca cannot be discharged in thyristor Th because of the presence of diode Da and capacitor C2 continues to be charged, its charge being reduced only by the low voltage drop across thyristor Th in the conductive state. Thus, the presence of the auxiliary capacitor Ca constituting an auxiliary voltage source does not cause additional ohmic losses in the circuit.

The circuits of FIGS. 1 and 2 are given by way of example only of the various possible applications of the present invention. As is apparent to those skilled in the art, various modification can be made to the present invention. Two distinctive features present in certain embodiments of the invention may be noted:

simultaneous provision of a high d.c. voltage and a low d.c. voltage, provision of the low d.c. voltage without ohmic power consumption.

Having thus described illustrative embodiments of the invention, various alterations, modifications and improvements will readily occur to those skilled in the art. Such alterations, modifications, and improvements are intended to be within the spirit and scope of the invention. Accordingly, the foregoing description is by way of example only and is not intended as limiting. The invention is limited only as defined in the following claims and the equivalents thereto.

What is claimed is:

1. A device for providing a high and a low d.c. voltage source, wherein:

the high voltage source comprises a first capacitor that receives a rectified a.c. voltage, the first capacitor being serially connected with the low voltage source; and wherein the low voltage source includes, in parallel:

a first diode connected in series with a second capacitor, a rectifier having a polarity opposite to that of the first diode, and a breakover voltage limiter, wherein terminals of the low d.c. voltage source correspond to terminals of the second capacitor.

2. The device of claim 1, wherein the breakover voltage limiter includes a zener diode and a thyristor having a gate and an anode, the gate being connected to the anode through the zener diode.

3. The device of claim 1, wherein current limiting means is connected in series between the high voltage source and the low voltage source.

4. A circuit that provides a high-level d.c. voltage between a first terminal and a reference terminal and provides a low-level d.c. voltage between a second terminal and the reference terminal, the circuit comprising:

a first capacitor coupled between the first terminal and the reference terminal;

a series combination of a first diode and a second capacitor coupled in series between the first capacitor and the reference terminal, the first diode and the second capacitor each having first and second terminals, the first terminal of the first diode being coupled to the first capacitor and the second terminal of the first diode being connected to the first terminal of the second capacitor, the first terminal of the second capacitor being connected to the second terminal of the circuit; and a breakover device coupled in parallel with the series combination of the first diode and the second capacitor.

5. The circuit of claim 4, wherein the breakover device includes:

a thyristor having an anode that is connected to the first terminal of the first diode, a cathode that is connected to the reference terminal, and a gate; and a zener diode having an anode that is connected to the gate of the thyristor and a cathode that is connected to the anode of the thyristor.

6. The circuit of claim 5, further comprising:

a rectifier coupled in parallel with the breakover device, the rectifier having a polarity opposite that of the first diode.

7. The circuit of claim 6, further comprising:

a rectifying bridge, coupled between the first terminal of the circuit and the reference terminal, that provides a rectified a.c. voltage to the first capacitor.

8. The circuit of claim 7, further comprising:

a current limiting device, connected in series between the first capacitor and the first diode.

9. The circuit of claim 4, further comprising:

a rectifier coupled in parallel with the breakover device, the rectifier having a polarity opposite that of the first diode.

10. The circuit of claim 4, further comprising:

a second reference terminal; and a rectifying bridge, coupled between the first terminal of the circuit and the second reference terminal of the circuit that provides a rectified a.c. voltage to the first capacitor.

11. The circuit of claim 10, wherein the breakover device includes:

a thyristor having an anode that is connected to the first terminal of the first diode, a cathode that is connected to the second reference terminal, and a gate; and a zener diode having an anode that is connected to the gate of the thyristor and a cathode that is connected to the anode of the thyristor.

12. The circuit of claim 11, further comprising:

a third capacitor coupled in series with a second diode between the first terminal and the second reference terminal; and a third diode coupled between the reference terminal and the second reference terminal.

13. The circuit of claim 12, further comprising:

a first discharge circuit having a first terminal that is connected between the third capacitor and the second diode, and second and third terminals that are connected to the reference terminal; and a second discharge circuit having a first terminal that is connected between the first capacitor and the first diode, a second terminal that is connected to the reference terminal and a third terminal that is connected between the third capacitor and the second diode.

14. The circuit of claim 13, wherein the first and second discharge circuits each include a thyristor having a gate that is coupled to an anode of a zener diode, a cathode of the thyristor forming the first terminal of a respective discharge circuit, an anode of the thyristor forming the second terminal of the respective discharge circuit, and a cathode of the zener diode forming the third terminal of the respective discharge circuit.

15. A circuit for providing a high-level d.c. voltage and a low-level d.c. voltage, the circuit comprising:

a first capacitor for receiving a rectified a.c. voltage having a maximum value, storing a first voltage, and providing the first voltage as the high-level d.c. voltage when the first voltage is greater than the rectified a.c. voltage;

a second capacitor coupled in series with the first capacitor, for storing a second voltage and providing the second voltage as the low-level d.c. voltage;

charge means, coupled in series between the first capacitor and the second capacitor, for charging the first and second capacitors when the rectified a.c. voltage is greater than the first voltage; and breakover means, coupled in series with the first capacitor, for limiting the low-level d.c. voltage to the second voltage and charging the first capacitor to substantially the maximum value when the rectified a.c. voltage is greater than the first voltage.

16. The circuit of claim 15, wherein the breakover means includes means for minimizing a voltage drop across the breakover means so that the first capacitor is charged to substantially the maximum value.

17. The circuit of claim 15, further comprising:

discharge means, coupled in series with the first capacitor and in parallel with a series combination of the charge means and the second capacitor, for discharging the first capacitor when the rectified a.c. voltage is less than the first voltage.

18. The circuit of claim 17, further comprising:

current limiting means, coupled in series between the first capacitor and the charge means, for limiting current surges in the first and second capacitors.

19. The circuit of claim 15, wherein the breakover means is coupled in parallel with a series combination of the charge means and the second capacitor, and wherein the breakover means includes:

a thyristor having an anode that is connected between the first capacitor and the charge means, a cathode that is connected to the second capacitor, and a gate; and a zener diode having an anode that is connected to the gate of the thyristor and a cathode that is connected to the anode of the thyristor.

20. The circuit of claim 15, further comprising:

a rectifying bridge for providing the rectified a.c. voltage to the first capacitor, the rectifying bridge having a first terminal that is connected to the first capacitor and a second terminal that is connected to the second capacitor;

wherein the breakover means includes means for electrically coupling the first capacitor between the first and second terminals of the rectifying bridge with minimal ohmic losses when the breakover means limits the low-level d.c. voltage to the second voltage.

21. The circuit of claim 15, further comprising:

a third capacitor, coupled in parallel with the first capacitor, for receiving the rectified a.c. voltage, storing a third voltage, and providing the third voltage as the high-level d.c. voltage when the third voltage is greater than the rectified a.c. voltage.

22. The circuit of claim 21, wherein the first capacitor provides the first voltage as the high-level d.c. voltage when the first voltage is greater than the rectified a.c. voltage and greater than the third voltage.

23. The circuit of claim 21, further comprising:

second charge means, coupled in series with the third capacitor, for charging the third capacitor when the rectified a.c. voltage is greater than the third voltage.

24. The circuit of claim 23, further comprising:

first discharge means, coupled to the first capacitor and the third capacitor, for discharging the first capacitor when the rectified a.c. voltage is less than the first voltage and the first voltage is greater than the third voltage; and second discharge means, coupled to the third capacitor, for discharging the third capacitor when the rectified a.c. voltage is less than the third voltage and the third voltage is greater than the first voltage.

* * * * *